Figure 1:
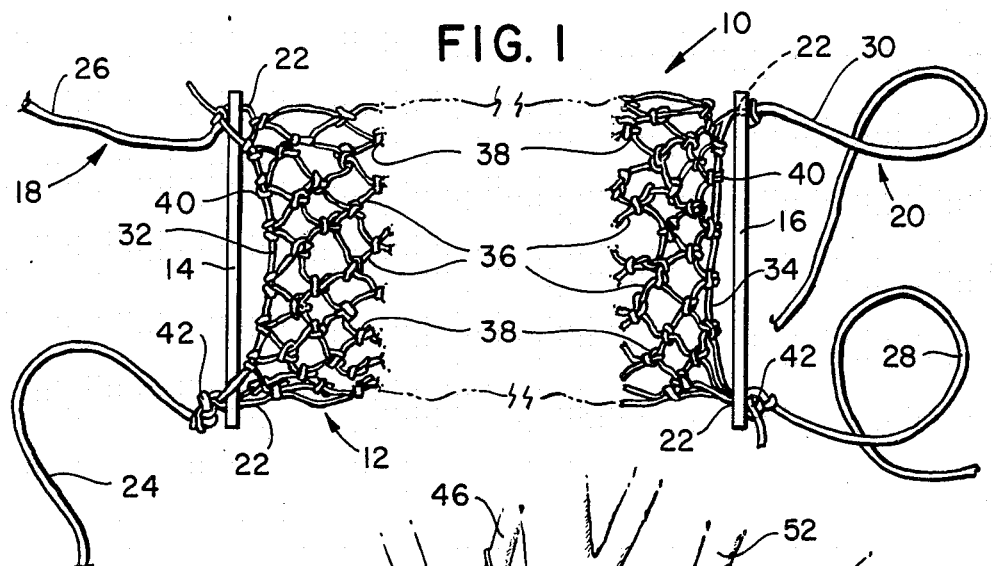

United States Patent [19]

Johnson

[11] Patent Number: 4,553,635
[45] Date of Patent: Nov. 19, 1985

[54] PORTABLE TREE STAND

[76] Inventor: Vaino A. Johnson, 215 Rankin St., Rockland, Me. 04841

[21] Appl. No.: 727,106

[22] Filed: Apr. 25, 1985

[51] Int. Cl.[4] .......................... A47C 9/10; A45F 3/26; A01M 31/02
[52] U.S. Cl. .................................. 182/187; 297/118; 297/217
[58] Field of Search ................ 182/187, 188; 297/118; 5/123, 122, 120

[56] References Cited

U.S. PATENT DOCUMENTS

| 787,632 | 4/1905 | Palmer | 5/123 |
|---|---|---|---|
| 1,515,263 | 11/1924 | Matsusaki | 5/122 |
| 2,847,059 | 8/1958 | Klins | 182/187 |
| 2,851,085 | 9/1958 | Woodward | 182/187 |
| 3,902,731 | 9/1975 | Fagen | 5/123 |
| 4,162,550 | 7/1979 | Willingham | 5/123 |
| 4,315,655 | 2/1982 | Machnik | 182/187 |
| 4,397,500 | 8/1983 | Moffitt | 182/187 |

Primary Examiner—Reinaldo P. Machado
Attorney, Agent, or Firm—W. R. Hulbert

[57] ABSTRACT

A portable tree stand for use by hunters, nature observers and the like has a seat of weight-supporting mesh extending between a pair of rigid structural elements at the sides, and ropes at the corners for suspending the seat from branches of a tree extend along the inside of the structural elements for attachment of the seat. The tree stand is lightweight and rolls into a compact package for ease of transportation. In one embodiment, for safety of the user, the ropes and cords of the seat are of a color easily observable by a person on the ground.

3 Claims, 2 Drawing Figures

U.S. Patent  Nov. 19, 1985  4,553,635

PORTABLE TREE STAND

The invention relates to tree stands for use by hunters and nature observers and the like for sitting in the branches of a tree where they cannot be readily observed by wildlife on the ground below.

In its most basic form, a tree stand consists of one or several boards or several lengths of wood, either carried to the site or collected in the area, affixed to a single branch, e.g. by means of nails or string, or resting across two branches at about the same height to provide a perch for several hours at a time.

Objects of this invention include to provide a tree stand that is light in weight and adapted to be folded or rolled into a compact package for ease of carrying; to provide a tree stand that can be suspended from one, two, three or four branches of a tree to provide a seat at a selected height; and to provide a tree stand that forms a safe perch, and one that can be used comfortably for several hours at a time.

SUMMARY OF THE INVENTION

According to the invention, a portable tree stand having a generally rectangular seat, for use by hunters, nature observers and the like, comprises a pair of rigid structural elements adjacent opposite side edges of the seat, each element defining a through opening generally transverse to the axis of the element adjacent each end thereof, at the corners of the seat; and at each side of the seat, attachment means consisting of first and second lengths of rope, each having a center portion extending parallel to the structural element and forming a side edge of the seat along the inside of the respective element, and the lengths of rope, at both ends of each center portion, extending through the openings in the respective elements, the free ends of the ropes adapted for attachment to the tree. The seat extends between the side edges formed by the center portions of the ropes and comprises a multiplicity of crossed seat cords affixed to each other at their intersections to form a weight-supporting mesh, and is affixed to the center portions of the ropes at the side edges of the seat. At the corners of the seat, ends of the cords extend through the openings in the rigid structural elements and are joined to the first and second ropes outside the rigid structural elements, the means joining the ropes and the cords being of a size relative to the openings in the elements to prevent movement of the structural elements outwardly, along the free ends of the first and second ropes, away from the side edges of the seat. The seat is thereby adapted to be suspended in a tree by attachment of the free ends of the first and second ropes extending from adjacent the corners of the seat to branches of the tree, and, upon removal from the tree, the tree stand is further adapted to be rolled into a compact package for ease of carrying.

In preferred embodiments, for the safety of the user, at least a portion of the ropes and cords are of a color easily observable by others; and the seat is affixed to the center portions of the ropes by means of double half hitch knots formed in the seat cords about the ropes, and the seat cords are affixed to each other by means of half hitch knots formed in the seat cords, and the means joining the ropes and the cords outside the rigid frame elements are granny knots.

Other features and advantages of the invention will be understood from the following description of the preferred embodiment, and from the drawings.

PREFERRED EMBODIMENT

Figure 2:
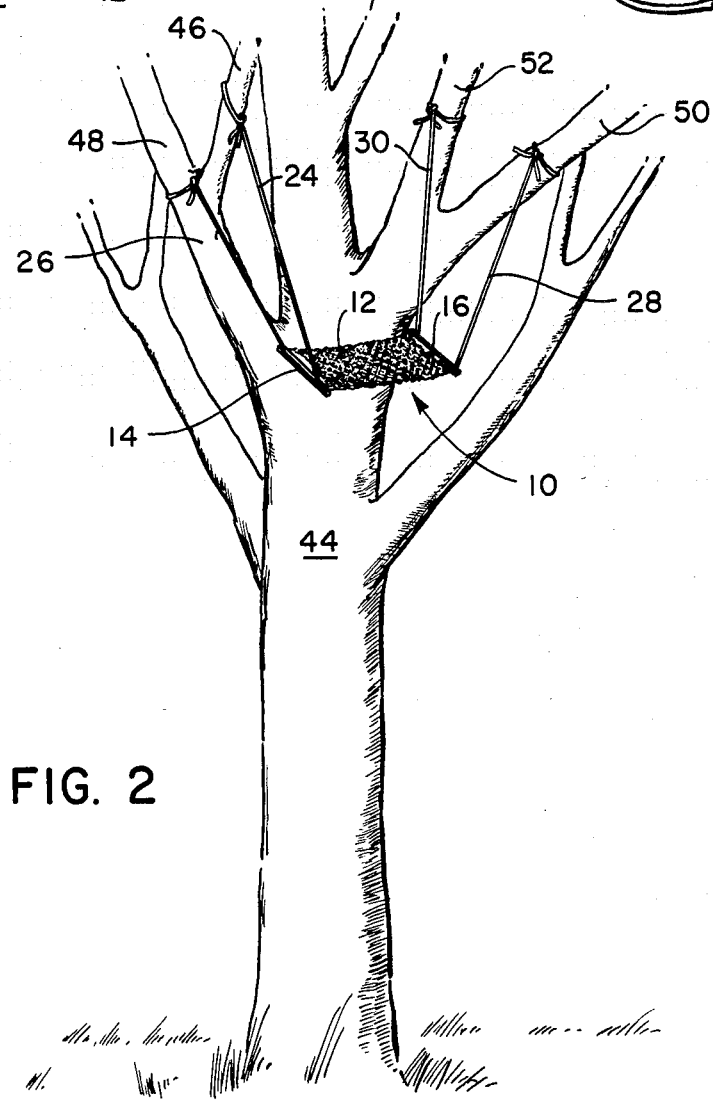

We briefly describe the drawings.
Drawings
FIG. 1 is a plan view of the portable tree stand of the invention; and
FIG. 2 is a perspective view of the tree stand of the invention in a tree.

The portable tree stand 10 consists of a generally rectangular seat 12, a pair of rigid structural elements 14, 16 adjacent opposite side edges of the seat, and, at each side of the seat, lengths of rope 18, 20 for suspending the seat from one to four branches of a tree.

The structural elements, e.g. oak bars about ¾ inch by ⅜ inch and 7 inches long, define through openings 22 (about ⅜ inch diameter) generally transverse to the axis of each element adjacent each end thereof, at the corners of the seat. (For clarity, one opening is shown in dashed line.) The lengths of rope, e.g. each being one strand polypropylene rope, 5/16 inch diameter by 8 feet in length, pass through both ends of the respective structural element, with the free ends 24, 26 and 28, 30 providing the means of attaching the stand to the tree. The center portions 32, 34 of the ropes extend parallel to the structural elements to form the side edges of the seat along the inside of the structural elements.

The seat extends between the side edges formed by the center portions of the ropes and is formed by a multiplicity of crossed seat cords 36, e.g. one strand polypropylene twine, 3/16 inch diameter, with a total length of about 48 feet. The cord is formed into a weight supporting mesh about 7 inches by 16 inches by joining the cords together at their intersections, e.g. in double half hitch knots 38, to form open squares about 1¼ on each side. The cords of the mesh seat are attached to the center portions of the side ropes, e.g. by forming the cords into double half hitch knots 40 about the ropes.

At the corners of the seat, the cords are passed through the respective openings and joined to the ropes immediately outside the structural elements, e.g., by means of knots, preferably granny knots 42, of a size relative to the openings to prevent movement of the structural elements outwardly, along the free ends of the ropes, away from the edges of the seat, thus securing the structural elements relative to the seat.

Referring to FIG. 2, a tree 44 is selected and the tree stand is suspended in a selected position by attaching the free ends 24, 26, 28, 30 of the ropes 18, 20 about selected branches. (In the drawing, the tree stand is suspended from four branches 46, 48, 50, 52. Where desired, the stand could be suspended from only one, two, or three branches.)

The hunter or nature observer then climbs the tree and sits comfortably and safely suspended in the tree stand, out of sight of any wildlife that may pass within view below. The nature of the tree stand, i.e., suspended rather than affixed to the tree, permits more movement, as the seat moves with the person.

When it is desired to leave the area, the tree stand is removed from the tree by untying the free end of the ropes. The structural elements and rope ends are rolled up in the mesh seat to provide a light weight, compact package for carrying out of the area.

Other embodiments are within the following claims. For example, during hunting season, for the safety of the user, the ropes and seat cords may be of a color easily observable by persons on the ground, e.g. they may be orange glow in color.

I claim:

1. A portable tree stand having a generally rectangular seat, for use by hunters, nature observers and the like, comprising:

a pair of rigid structural elements adjacent opposite side edges of said seat, each said structural element defining a through opening generally transverse to the axis of said element adjacent each end thereof, at the corners of said seat, at each side of said seat, attachment means consisting of first and second lengths of rope, each said length of rope having a center portion extending parallel to said structural element and forming a side edge of said seat along the inside of the respective structural element, and said lengths of rope, at both ends of each said center portion, extending through said openings in the respective structural elements, the free ends of said ropes adapted for attachment to said tree, the seat extending between the side edges formed by the center portions of said ropes comprising a multiplicity of crossed seat cords, said cords being affixed to each other at their intersections to form a weight-supporting mesh, and said seat being affixed to the center portions of the ropes at the side edges of said seat, at the corners of said seat, ends of said cords extending through said openings in said rigid structural elements and joined to said first and second ropes outside said rigid structural elements, the means joining said ropes and said cords being of a size relative to the openings in said elements to prevent movement of said structural elements outwardly, along the free ends of the first and second ropes, away from the side edges of said seat, whereby the seat is adapted to be suspended in a tree by attachment of the free ends of the first and second ropes extending from adjacent the corners of the seat to branches of the tree, and, upon removal from the tree, the tree stand is further adapted to be rolled into a compact package for ease of carrying.

2. The portable tree stand of claim 1 wherein, for the safety of the user, at least a portion of said ropes and cords are of a color easily observable by others.

3. The portable tree stand of claim 1 wherein said seat is affixed to the center portions of said ropes by means of double half hitch knots formed in said seat cords about said ropes, and said seat cords are affixed to each other by means of half hitch knots formed in said seat cords, and the means joining said ropes and said cords outside said rigid frame elements are granny knots.

* * * * *